(12) United States Patent
Kitazawa

(10) Patent No.: US 9,344,678 B2
(45) Date of Patent: May 17, 2016

(54) INFORMATION PROCESSING APPARATUS, INFORMATION PROCESSING METHOD AND COMPUTER-READABLE STORAGE MEDIUM

(71) Applicant: Kazuki Kitazawa, Kanagawa (JP)

(72) Inventor: Kazuki Kitazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 1 day.

(21) Appl. No.: 14/256,452

(22) Filed: Apr. 18, 2014

(65) Prior Publication Data

US 2014/0333716 A1 Nov. 13, 2014

(30) Foreign Application Priority Data

May 10, 2013 (JP) .................................. 2013-099961

(51) Int. Cl.
*H04N 7/14* (2006.01)
*H04N 7/15* (2006.01)
*H04W 88/02* (2009.01)
*H04W 88/06* (2009.01)

(52) U.S. Cl.
CPC ................. *H04N 7/15* (2013.01); *H04N 7/152* (2013.01); *H04W 88/02* (2013.01); *H04W 88/06* (2013.01)

(58) Field of Classification Search
CPC ............................... H04N 7/15; H04W 88/06
USPC ....................................................... 348/14.13
See application file for complete search history.

(56) References Cited

U.S. PATENT DOCUMENTS

| | | | |
|---|---|---|---|
| 2004/0174853 A1* | 9/2004 | Saito et al. | 370/338 |
| 2012/0151048 A1 | 6/2012 | Kitazawa | |
| 2013/0242034 A1 | 9/2013 | Kato et al. | |
| 2014/0078244 A1 | 3/2014 | Kitazawa et al. | |
| 2014/0139612 A1* | 5/2014 | Jeong | H04N 7/152 348/14.07 |

FOREIGN PATENT DOCUMENTS

| | | |
|---|---|---|
| JP | 2009-033652 | 2/2009 |
| JP | 2012-195926 | 10/2012 |

* cited by examiner

*Primary Examiner* — Creighton Smith
(74) *Attorney, Agent, or Firm* — Oblon, McClelland, Maier & Neustadt, L.L.P.

(57) ABSTRACT

An information processing apparatus is connected to a network. The information processing apparatus includes a first acquisition unit configured to obtain a piece of bandwidth information that indicates a bandwidth of the network to which the information processing apparatus is connected; and an operation state control unit configured to control an operation state of the information processing apparatus on the basis of a piece of first information associated with the piece of bandwidth information obtained by the first acquisition unit. The piece of first information is one of a plurality of pieces of first information each indicating a quality of an image that is able to be transmitted via the network by the information processing apparatus. The pieces of first information are stored in association with a plurality of pieces of bandwidth information in a first storage unit.

8 Claims, 9 Drawing Sheets

FIG.3

| BANDWIDTH INFORMATION | FIRST INFORMATION |
|---|---|
| 2 Mbps OR MORE | 1280×720/30 fps |
| EQUAL TO OR MORE THAN 1 Mbps AND EQUAL TO OR LESS THAN 2 Mbps | 640×360/30 fps |
| 1 Mbps OR LESS | 640×360/15 fps |

FIG.4

| SECOND INFORMATION | THIRD INFORMATION | FIRST ELECTRIC POWER |
|---|---|---|
| 1280×720/30 fps | 1920×1080/30 fps | 20 W |
| | 1280×720/30 fps | 18 W |
| 640×360/30 fps | 1920×1080/30 fps | 25 W |
| | 1280×720/30 fps | 22 W |
| | 640×360/30 fps | 15 W |
| 640×360/15 fps | 1920×1080/30 fps | 18 W |
| | 1280×720/30 fps | 15 W |
| | 640×360/30 fps | 13 W |

FIG.5

| THIRD INFORMATION | SECOND ELECTRIC POWER |
|---|---|
| 1920×1080/30 fps | 1000 mW |
| 1280×720/60 fps | 1380 mW |
| 1280×720/30 fps | 950 mW |
| 640×360/60 fps | 1050 mW |
| 640×360/30 fps | 900 mW |

INFORMATION PROCESSING APPARATUS, INFORMATION PROCESSING METHOD AND COMPUTER-READABLE STORAGE MEDIUM

CROSS-REFERENCE TO RELATED APPLICATION

The present application claims priority to and incorporates by reference the entire contents of Japanese Patent Application No. 2013-099961 filed in Japan on May 10, 2013.

BACKGROUND OF THE INVENTION

1. Field of the Invention

The present invention relates to an information processing apparatus, an information processing method, and a computer-readable storage medium.

2. Description of the Related Art

In a video conference system (which may also be referred to as a television conference system) for transmitting and receiving a large amount of conference data such as video data and audio data via a network in real time, there is a known technique for appropriately selecting an encoding mode in order to perform motion picture encoding with low power consumption.

For example, Japanese Patent Laid-Open No. 2009-033652 discloses a technique of a method for encoding a motion picture upon selecting one of multiple encoding modes, wherein one encoding mode is selected on the basis of the bit rate of already encoded motion picture, a target bit rate, and electric consumption power information corresponding to each encoding mode.

However, in the technique disclosed in Japanese Patent Laid-Open No. 2009-033652, a case where encoded data are transmitted and received via the Internet where the bandwidth changes at all time such as a video conference system is not taken into consideration. More specifically, the technique disclosed in Japanese Patent Laid-Open No. 2009-033652 cannot achieve both of the low power consumption and the optimum image quality in accordance with the band width of an available network.

Therefore, there is a need to provide an information processing apparatus, an information processing method, and a computer-readable storage medium, capable of achieving both of the low power consumption and the optimum image quality in accordance with the band width of an available network.

SUMMARY OF THE INVENTION

It is an object of the present invention to at least partially solve the problems in the conventional technology.

According to an embodiment, there is provided an information processing apparatus that is connected to a network and that includes a first acquisition unit configured to obtain a piece of bandwidth information that indicates a bandwidth of the network to which the information processing apparatus is connected; and an operation state control unit configured to control an operation state of the information processing apparatus on the basis of a piece of first information associated with the piece of bandwidth information obtained by the first acquisition unit. The piece of first information is one of a plurality of pieces of first information each indicating a quality of an image that is able to be transmitted via the network by the information processing apparatus. The pieces of first information are stored in association with a plurality of pieces of bandwidth information in a first storage unit.

According to another embodiment, there is provided an information processing method that includes obtaining a piece of bandwidth information that indicates a bandwidth of a network to which an information processing apparatus is connected; and controlling an operation state of the information processing apparatus on the basis of a piece of first information associated with the obtained piece of bandwidth information. The piece of first information is one of a plurality of pieces of first information each indicating a quality of an image that is able to be transmitted via the network by the information processing apparatus. The pieces of first information are stored in association with a plurality of pieces of bandwidth information in a storage unit.

According to still another embodiment, there is provided a non-transitory computer-readable storage medium with an executable program stored thereon and executed by a computer. The program instructs the computer to perform: obtaining a piece of bandwidth information that indicates a bandwidth of a network to which an information processing apparatus is connected; and controlling an operation state of the information processing apparatus on the basis of a piece of first information associated with the obtained piece of bandwidth information. The piece of first information is one of a plurality of pieces of first information each indicating a quality of an image that is able to be transmitted via the network by the information processing apparatus. The pieces of first information are stored in association with a plurality of pieces of bandwidth information in a storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a figure illustrating an example of information stored in a first storage unit;

FIG. 4 is a figure illustrating an example of information stored in a second storage unit;

FIG. 5 is a figure illustrating an example of information stored in a third storage unit;

DETAILED DESCRIPTION OF THE PREFERRED EMBODIMENTS

Embodiments of an information processing apparatus, an information processing method, and a program according to the present invention will be hereinafter explained in detail with reference to appended drawings. In the explanation below, a case where the present invention is applied to a video conference system will be used as an example, but the present invention is not limited thereto.

First Embodiment

Figure 1:
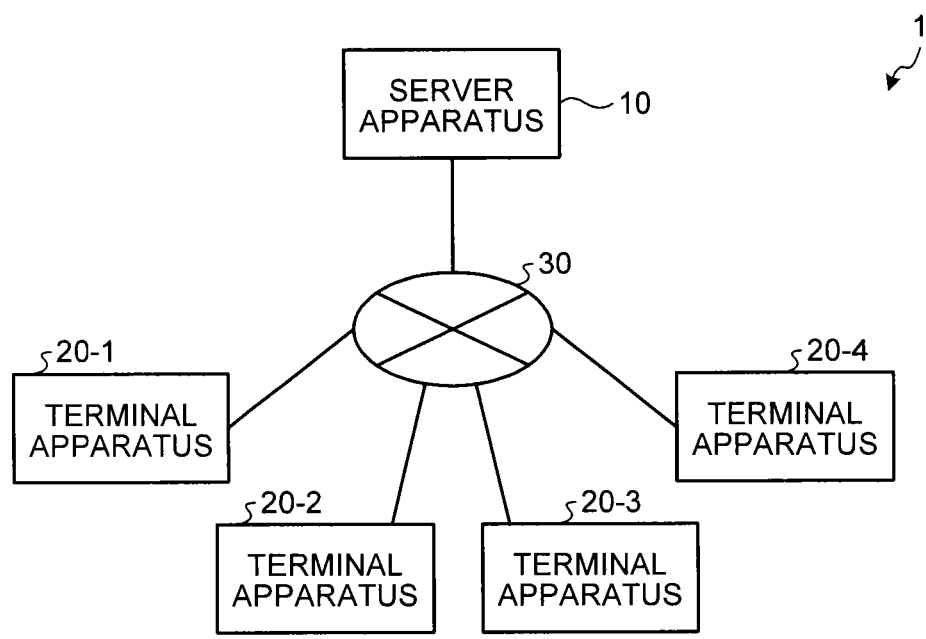
FIG. 1 is a block diagram illustrating an example of configuration of a video conference system according to an embodiment.

FIG. 1 is a block diagram illustrating an example of configuration of a video conference system 1 according to a first embodiment. As illustrated in FIG. 1, a video conference system 1 includes a server apparatus 10 and terminal apparatuses 20-1, 20-2, 20-3, 20-4 (an example of information processing apparatus). Each of the terminal apparatuses 20-1, 20-2, 20-3, 20-4 is connected to a server apparatus 10 via the Internet 30.

In the explanation below, when it is not necessary to distinguish the terminal apparatuses 20-1, 20-2, 20-3, 20-4 from each other, they may be simply referred to as a terminal apparatus 20. In FIG. 1, for example four terminal apparatuses 20 are illustrated, but the present embodiment is not limited thereto. The number of terminal apparatuses 20 may be any number.

The server apparatus 10 relays transmission and reception of video data and audio data (which may be referred to as "conference data" in the explanation below) between the terminal apparatuses 20 which conduct video conference. The server apparatus 10 has not only a relay function of conference data but also a monitor control function for monitoring (observing) whether each terminal apparatus 20 is connected to the server apparatus 10 and a conference control function for controlling start and end of a conference between the terminal apparatuses 20 which conduct the video conference.

The terminal apparatus 20 transmits and receives conference data via the server apparatus 10. For example, in a case where video conference is conducted by the terminal apparatuses 20-1, 20-2, 20-3, the conference data transmitted by the terminal apparatus 20-1 are transmitted to the terminal apparatuses 20-2, 20-3 via the server apparatus 10, and are not transmitted to the terminal apparatus 20-4. Likewise, the conference data transmitted by the terminal apparatuses 20-2, 20-3 are transmitted via the server apparatus 10 to the terminal apparatuses 20 which are participating in the conference, and are not transmitted to the terminal apparatus 20-4 which is not participating in the conference. By performing the control as described above, the conference can be conducted between multiple terminal apparatuses 20 (multiple locations).

In the present embodiment, the terminal apparatuses 20-1, 20-2, 20-3, 20-4 are considered to be a terminal dedicated for video conference, a notebook PC (Personal Computer), or a portable terminal such as a tablet, but the present embodiment is not limited thereto.

Figure 2:
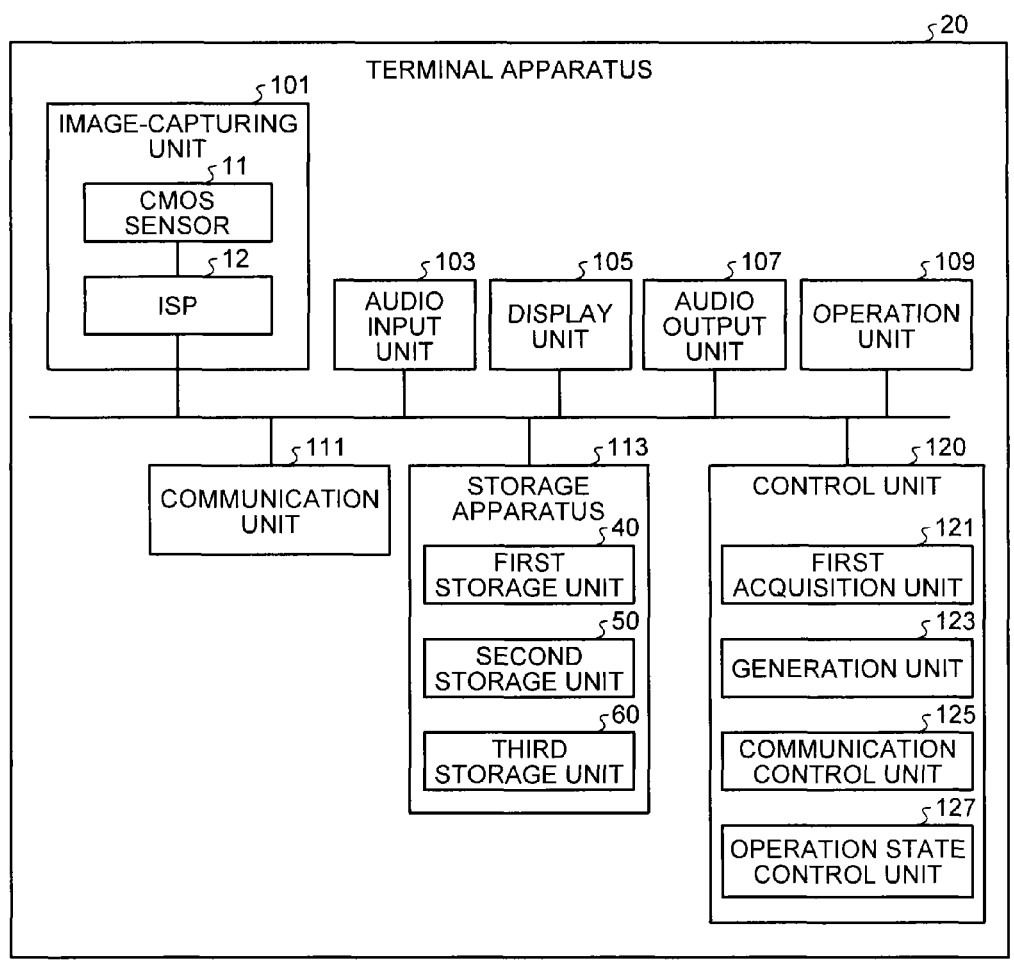
FIG. 2 is a block diagram illustrating an example of configuration of a terminal apparatus according to a first embodiment.

FIG. 2 is a block diagram illustrating an example of configuration of the terminal apparatus 20 according to the present embodiment. As illustrated in FIG. 2, the terminal apparatus 20 includes an image-capturing unit 101, an audio input unit 103, a display unit 105, an audio output unit 107, an operation unit 109, a communication unit 111, a storage apparatus 113, and a control unit 120.

The image-capturing unit 101 is a device for capturing an image of a participant (an example of an object to be captured) of a conference who uses a terminal apparatus 20. In the explanation below, an image generated in accordance with image capturing of the image-capturing unit 101 may be referred to as a captured image. In the example of FIG. 2, the image-capturing unit 101 includes a CMOS (Complementary Metal Oxide Semiconductor) sensor 11 and an ISP (Image Signal Processor) 12. The CMOS sensor 11 has a function of converting video (optical signal) appearing on the sensor into an electric signal using a photodiode. The ISP 12 applies color adjustment and image adjustment (performs image processing) to the image received from the CMOS sensor 11, and outputs an image signal (captured image) to the control unit 120.

The audio input unit 103 is to input sound and the like which is spoken by a participant of a conference who uses the terminal apparatus 20, and can be achieved with an audio input device such as a microphone.

The display unit 105 displays various kinds of screens such as conference materials and conference images (images of participants of the conference), and can be achieved with a display device such as a liquid crystal display and a touch-panel display.

The audio output unit 107 is to output the sound spoken by a participant of the conference other than the participant of the conference who uses the terminal apparatus 20, and can be achieved with an audio output device such as a speaker.

The operation unit 109 is used by the participant of the conference who uses the terminal apparatus 20 to input various kinds of operations, and can be achieved with input devices such as a mouse, a keyboard, a touch pad, and a touch panel.

The communication unit 111 has a function of communicating with an external device such as the server apparatus 10 via the Internet 30. The communication unit 111 may be, for example, a wired LAN supporting 10Base-T, 100Base-Tx, 1000Base-T and connected to Ethernet (registered trademark) or wireless LAN supporting 802.11a/b/g/n.

The storage apparatus 113 stores, e.g., various kinds of programs executed by the terminal apparatus 20 and data used for various kinds of processing performed by the terminal apparatus 20. The storage apparatus 113 can be achieved with at least one of storage devices capable of storing data in magnetic, optical, and electric manner, such as an HDD (Hard Disk Drive), an SSD (Solid State Drive), a memory card, an optical disk, RAM (Random Access Memory), and the like.

In the present embodiment, the storage apparatus 113 includes a first storage unit 40, a second storage unit 50, and a third storage unit 60. The detailed contents about the first storage unit 40, the second storage unit 50, and the third storage unit 60 will be explained later.

The control unit 120 centrally controls overall operation of the terminal apparatus 20. The control unit 120 controls the video conference, and in addition, the control unit 120 has a codec function for encoding audio data obtained from the audio input unit 103 and image data (captured image) generated in accordance with the image-capturing process performed by the image-capturing unit 101 and outputs the audio data to the communication unit 111, and decodes the conference data received by the communication unit 111 and outputs the conference data to the display unit 105 and the audio output unit 107. Examples of codec include H.264/AVC and H.264/SVC. The function of the control unit 120 may be achieved with software, i.e., for example, causing a processing device such as a CPU (Central Processing Unit) to execute programs, or may be achieved with hardware such as an IC (Integrated Circuit), or may be achieved using both of the software and the hardware.

In the present embodiment, the control unit 120 includes a first acquisition unit 121, a generation unit 123, a communication control unit 125, and an operation state control unit 127.

The first acquisition unit 121 obtains bandwidth information indicating the bandwidth of the network to which the terminal apparatus 20 is connected. Examples of methods for obtaining the bandwidth information include a method for pinging the server apparatus 10 in parallel with the video conference and obtaining the bandwidth information by deriving a logical bandwidth from a round trip time, or obtaining the bandwidth information by using RTCP (Real time Transport Control Protocol) in a case where the video conference is based on RTP (Real time Transport Protocol).

The generation unit 123 generates a transmission image by compressing and encoding the captured image which is output from the image-capturing unit 101. The communication control unit 125 controls communication with another terminal apparatus 20 via the network (the Internet 30). For example, the communication control unit 125 controls transmission of the image generated by the generation unit 123 to another terminal apparatus 20.

Subsequently, before the function of the operation state control unit 127 is explained, specific contents of the first storage unit 40, the second storage unit 50, and the third storage unit 60 will be explained.

For each of multiple pieces of bandwidth information indicating the bandwidth of the network used in the video conference, each of the first storage units 40 stores first information indicating the quality of an image that can be transmitted via the network by the terminal apparatus 20 in such a manner that the first information is associated with the bandwidth information. FIG. 3 is a figure illustrating an example of information stored in the first storage unit 40. In this case, the first information is constituted by information indicating the screen resolution and the frame rate, but is not limited thereto. In general, when the resolution or the frame rate of an image increases, the bit rate also increases, and accordingly, the file size of an image file increases. For this reason, when there is a change in the network bandwidth used in the video conference, there is also a change in the quality of an image that is able to be transmitted (in this example, the screen resolution and the frame rate).

In this example, the data in a table format as illustrated in FIG. 3 are stored to the storage apparatus 113, but the storage apparatus 113 is not limited thereto. For example, the data in a table format as illustrated in FIG. 3 may be stored to the server apparatus 10, and the terminal apparatus 20 may obtain the data in a table format as illustrated in FIG. 3 via the network from the server apparatus 10.

Referring back to FIG. 2, explanation will be continued. The second storage unit 50 stores second information indicating the quality of an image generated in compression and encoding performed by the generation unit 123, third information indicating the quality of a captured image, and a first electric power indicating electric power required for compression and encoding performed by the generation unit 123 in such a manner that they are associated with each other. In this case, like the first information, the second information and the third information are constituted by information indicating the screen resolution and the frame rate, but are not limited thereto. FIG. 4 is a figure illustrating an example of information stored in the second storage unit 50. In accordance with a combination of the second information and the third information, there is a change in the amount of computation by the control unit 120 (generation unit 123), and accordingly, there is also a change in the electric power consumed by the control unit 120 (the electric power indicated by the first electric power).

In this example, the data in a table format as illustrated in FIG. 4 are stored to the storage apparatus 113, but the storage apparatus 113 is not limited thereto. For example, the data in a table format as illustrated in FIG. 4 may be stored to the server apparatus 10, and the terminal apparatus 20 may obtain the data in a table format as illustrated in FIG. 4 via the network from the server apparatus 10.

Referring back to FIG. 2, explanation will be continued. The third storage unit 60 stores the third information and the second electric power indicating electric power required by the image-capturing unit 101 to generate the captured image of the quality indicated by the third information in such a manner that the third information and the second electric power are associated with each other. FIG. 5 is a figure illustrating an example of information stored in the third storage unit 60. In this example, the data in a table format as illustrated in FIG. 5 are stored to the storage apparatus 113, but the storage apparatus 113 is not limited thereto. For example, the data in a table format as illustrated in FIG. 5 may be stored to the server apparatus 10, and the terminal apparatus 20 may obtain the data in a table format as illustrated in FIG. 5 via the network from the server apparatus 10.

Subsequently, the function of the operation state control unit 127 will be explained. The operation state control unit 127 controls the operation state of the terminal apparatus 20 on the basis of one of multiple pieces of first information stored in the first storage unit 40 and associated with the bandwidth information obtained by the first acquisition unit 121. More specifically, on the basis of the first information associated with the bandwidth information obtained by the first acquisition unit 121, the operation state control unit 127 determines the setting of compression and encoding performed by the generation unit 123 and the resolution of the captured image so as to minimize the electric power consumed by the terminal apparatus 20.

In addition, the operation state control unit 127 identifies first information associated with the bandwidth information obtained by the first acquisition unit 121 from among multiple pieces of first information stored in the first storage unit 40. The operation state control unit 127 identifies second information associated with the identified first information (matching the identified first information in this case) from among multiple pieces of second information stored in the second storage unit 50. Then, the operation state control unit 127 identifies third information associated with the identified second information and minimizing the associated first electric power from among multiple pieces of third information stored in the second storage unit 50. Then, the operation state control unit 127 determines the setting of compression and encoding performed by the generation unit 123 on the basis of the combination of the second information and the third information thus identified, and determines the resolution of the captured image in accordance with the identified third information.

Figure 6:
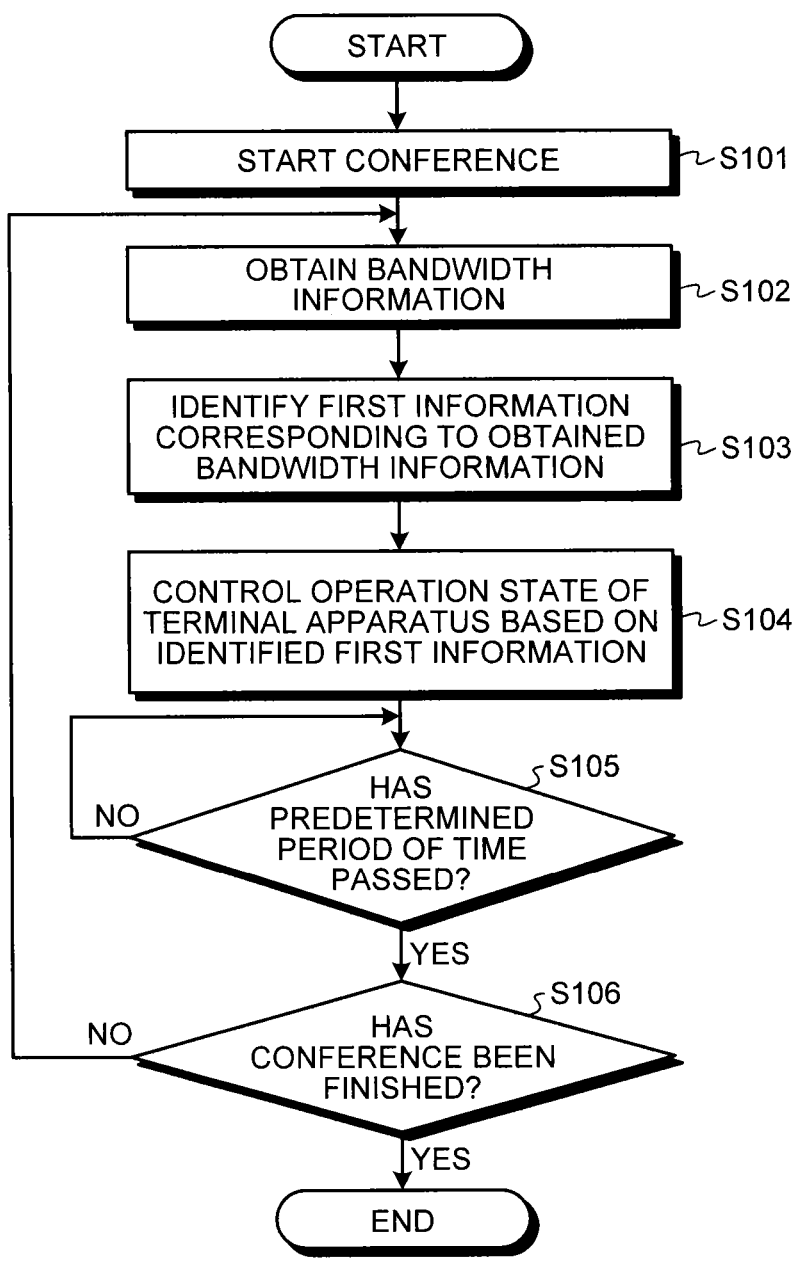
FIG. 6 is a flowchart illustrating an example of processing during video conference executed by the terminal apparatus according to the first embodiment.

FIG. 6 is a flowchart illustrating an example of processing during video conference executed by the terminal apparatus 20 according to the present embodiment.

First, the control unit 120 carries out, e.g., selection of a terminal with which the video conference is conducted, and thereafter, the control unit 120 starts the conference on the basis of a command given by the server apparatus 10 (step S101).

Subsequently, the first acquisition unit 121 obtains the bandwidth information indicating the bandwidth of the network to which the terminal apparatus 20 is connected (step S102). As described above, examples of methods for obtaining the bandwidth information include a method for pinging the server apparatus 10 in parallel with the video conference and obtaining the bandwidth information by deriving a logical bandwidth from a round trip time, or obtaining the bandwidth information by using RTCP (Real time Transport Control Protocol) in a case where the video conference is based on RTP (Real time Transport Protocol).

Subsequently, the operation state control unit 127 identifies the first information associated with the bandwidth information obtained in step S102 (step S103). More specifically, the operation state control unit 127 identifies the first information associated with the band width information obtained in step S102 from among multiple pieces of first information stored in the first storage unit 40.

Subsequently, the operation state control unit 127 controls the operation state of the terminal apparatus 20 on the basis of the first information identified in step S103 (step S104).

Now, for example, suppose a case where the bandwidth information obtained in step S102 indicates a bandwidth of 2 Mbps or more. In this case, in step S103, the operation state control unit 127 identifies the first information associated with the bandwidth information indicating a bandwidth of 2 Mbps or more from among multiple pieces of first information as illustrated in FIG. 3 (information indicating a resolution of 1280 pixels in the horizontal direction and 720 pixels in the vertical direction and information indicating a frame rate of 30 fps in this example). Then, in step S104, the operation state control unit 127 identifies the second information matching the identified first information from among multiple pieces of second information as illustrated in FIG. 4. Then, the operation state control unit 127 identifies the third information associated with the identified second information and minimizing the associated first electric power (information indicating a resolution of 1280 pixels in the horizontal direction and 720 pixels in the vertical direction and information indicating a frame rate of 30 fps in this example). Then, the operation state control unit 127 determines the setting of compression and encoding performed by the generation unit 123 on the basis of the combination of the second information and the third information thus identified, and determines the resolution of the captured image in accordance with the identified third information. In this example, the resolution of the captured image is determined as 1280 pixels in the horizontal direction and 720 pixels in the vertical direction.

It may also be possible to perform control so as to go into the state in which the electric power consumption of the terminal apparatus 20 is simply minimized and the balance is maintained between the alleviation of image quality degradation and the electric power consumption. For example, when the control unit 120 enlarges an image, an image which the control unit 120 receives from the image-capturing unit 101 (captured image) desirably has resolution as high as possible in terms of image quality. In this case, in order to ensure the image quality, there is an option to enhance the electric power consumption of the image-capturing unit 101.

After step S104 explained above, the control unit 120 determines whether a certain period of time has passes or not (step S105). When the control unit 120 determines that the certain period of time has passed (step S105: YES), the control unit 120 determines whether the video conference has been finished or not (step S106). When the control unit 120 determines that the video conference has been finished (step S106: YES), the processing is terminated. On the other hand, when the control unit 120 determines that the video conference has not been finished (step S106: NO), the processing in step S102 and subsequent steps explained above are repeated.

As explained above, in the present embodiment, there is provided the first storage unit 40 each of which stores first information indicating the quality of an image that is able to be transmitted via the network by the terminal apparatus 20, in such a manner that the first information is associated with the bandwidth information, for each of multiple pieces of bandwidth information indicating the bandwidth of the network used in the video conference. Then, the first acquisition unit 121 obtains the bandwidth information indicating the bandwidth of the network to which the terminal apparatus 20 is connected, and the operation state control unit 127 controls the operation state of the terminal apparatus 20 on the basis of one of multiple pieces of first information stored in the first storage unit 40 and associated with the bandwidth information obtained by the first acquisition unit 121. More specifically, on the basis of the first information associated with the bandwidth information obtained by the first acquisition unit 121, the operation state control unit 127 determines the setting of compression and encoding performed by the generation unit 123 and the resolution of the captured image so as to minimize the electric power consumed by the terminal apparatus 20. Therefore, not only the optimum image quality but also the low electric power consumption can be achieved in accordance with the bandwidth of the network that can be used.

Second Embodiment

Subsequently, a second embodiment will be explained. The second embodiment is different from the first embodiment in that the operation state of the terminal apparatus 20 is controlled in view of the third information indicating the quality of an image that is displayable in a terminal with which the video conference is conducted via the network. This will be hereinafter explained in a more specific manner. Explanations about portions different from the first embodiment explained above are omitted as necessary.

Figure 7:
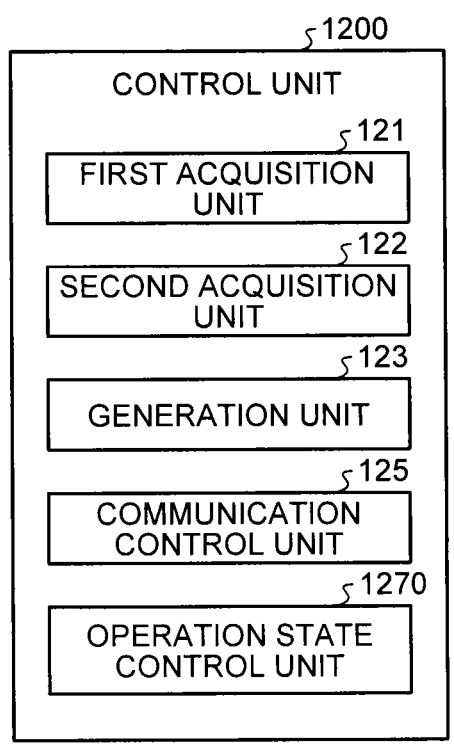
FIG. 7 is a block diagram illustrating an example of functional configuration of a control unit according to a second embodiment.

FIG. 7 is a block diagram illustrating an example of functional configuration of a control unit 1200 according to the second embodiment. As illustrated in FIG. 7, the control unit 1200 further includes a second acquisition unit 122. The second acquisition unit 122 obtains the fourth information indicating the quality of an image that is displayable in a terminal with which the video conference is conducted via the network. The operation state control unit 1270 determines the fifth information indicating the quality of an image transmitted to the terminal with which the video conference is conducted, on the basis of the first information associated with the bandwidth information obtained by the first acquisition unit 121 and the fourth information obtained by the second acquisition unit 122, and controls the operation state of the terminal apparatus 20 on the basis of the fifth information. In this case, each of the fourth information and the fifth information is constituted by information indicating the screen resolution and the frame rate, but is not limited thereto.

Figure 8:
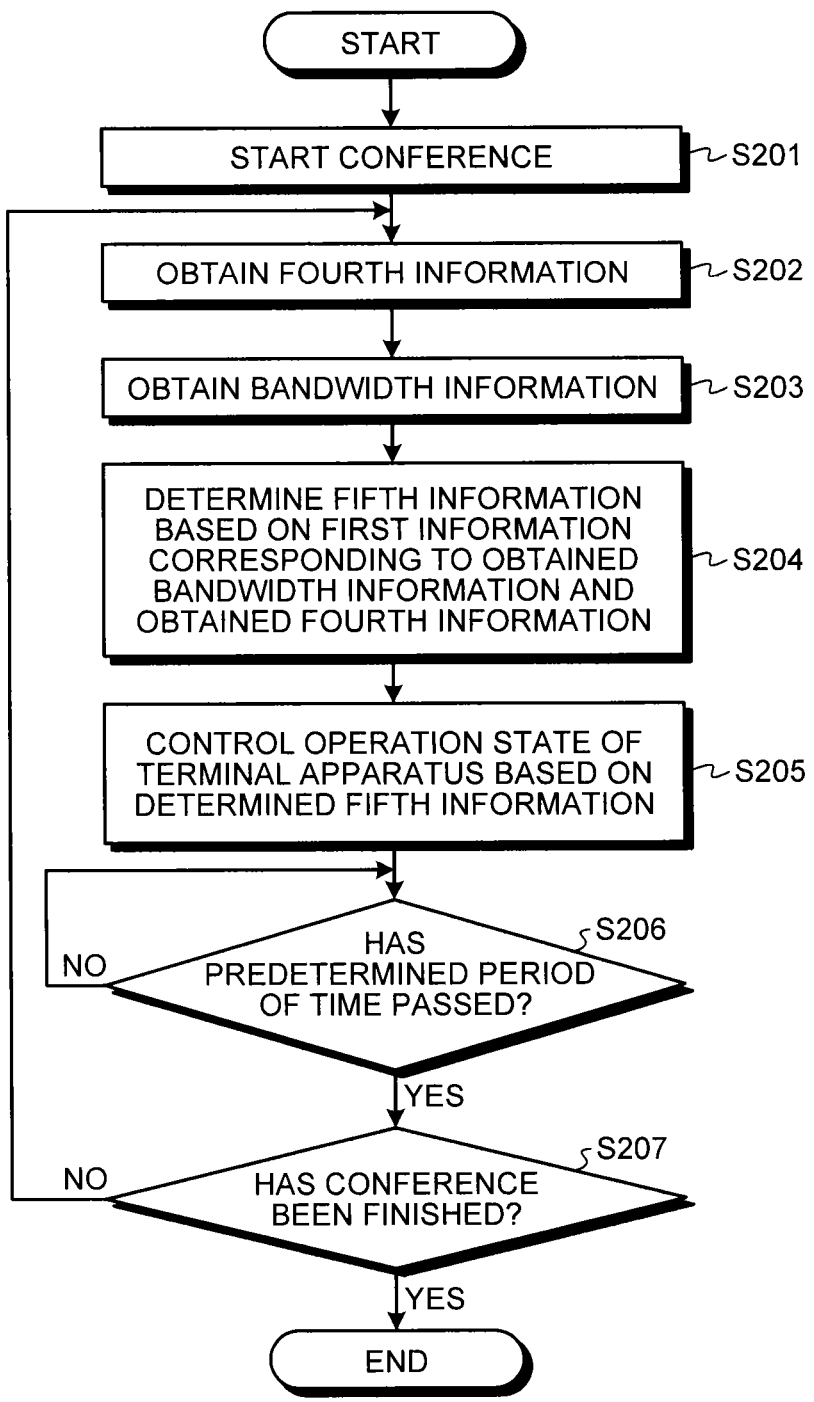
FIG. 8 is a flowchart illustrating an example of processing during video conference executed by a terminal apparatus according to the second embodiment.

FIG. 8 is a flowchart illustrating an example of processing during video conference executed by the terminal apparatus 20 according to the second embodiment.

First, the control unit 1200 carries out, e.g., selection of a terminal with which the video conference is conducted, and thereafter, the control unit 1200 starts the conference on the basis of a command given by the server apparatus 10 (step S201).

Subsequently, the second acquisition unit 122 obtains the fourth information indicating the quality of an image that is displayable in a terminal with which the video conference is conducted (step S202).

Subsequently, the first acquisition unit 121 obtains the bandwidth information indicating the bandwidth of the network to which the terminal apparatus 20 is connected (step S203).

Subsequently, the operation state control unit 1270 determines the fifth information indicating the quality of an image transmitted to a terminal with which the video conference is conducted on the basis of the first information associated with the bandwidth information obtained in step S203 and the fourth information obtained in step S202 (step S204).

Now, suppose a case where, for example, the fourth information obtained in step S202 indicates resolution of 640 pixels in the horizontal direction and 360 pixels in the vertical direction and a frame rate of 30 fps, and the band width information obtained in step S203 indicates 2 Mbps or more. In this case, in step S204, the operation state control unit 1270 identifies the first information associated with the bandwidth information indicating 2 Mbps or more from among multiple pieces of first information as illustrated in FIG. 3 (information indicating resolution of 1280 pixels in the horizontal direction and 720 pixels in the vertical direction and information indicating a frame rate of 30 fps in this example). In this case, the quality of an image indicated by the first information thus identified is higher than the quality of an image that can be displayed by a terminal with which the video conference is conducted (the quality of the image indicated by the fourth information obtained in step S202), and therefore, the operation state control unit 1270 determines the fourth information obtained in step S202 as the fifth information indicating the quality of the image transmitted to the terminal with which the video conference is conducted so that the quality of the image transmitted to the terminal with which the video conference is conducted is adjusted to match the quality that is displayable in the terminal with which the video conference is conducted.

After step S204, the operation state control unit 1270 controls the operation state of the terminal apparatus 20 on the basis of the fifth information thus determined (step S205). More specifically, the operation state control unit 1270 controls the operation state of the terminal apparatus 20 so as to minimize the electric power consumption of the terminal apparatus 20 on the basis of the determined fifth information. For example, in a case where the determined fifth information indicates resolution of 640 pixels in the horizontal direction and 360 pixels in the vertical direction and a frame rate of 30 fps, the operation state control unit 127 identifies the second information associated with the determined fifth information (matching the determined fifth information in this case) from among multiple pieces of second information as illustrated in FIG. 4. Then, the operation state control unit 1270 identifies the third information associated with the identified second information and minimizing the associated first electric power (information indicating resolution of 640 pixels in the horizontal direction and 360 pixels in the vertical direction and information indicating a frame rate of 30 fps in this example). Then, the operation state control unit 1270 determines the setting of compression and encoding performed by the generation unit 123 on the basis of the combination of the second information and the third information thus identified, and determines the resolution of the captured image in accordance with the identified third information. In this example, the resolution of the captured image is determined as 640 pixels in the horizontal direction and 360 pixels in the vertical direction.

After step S205 explained above, the control unit 1200 determines whether a certain period of time has passes or not (step S206). When the control unit 1200 determines that the certain period of time has passed (step S206: YES), the control unit 1200 determines whether the video conference has been finished or not (step S207). When the control unit 1200 determines that the video conference has been finished (step S207: YES), the processing is terminated. On the other hand, when the control unit 1200 determines that the video conference has not been finished (step S207: NO), the processing in step S202 and subsequent steps explained above are repeated.

As explained above, in the present embodiment, the operation state of the terminal apparatus 20 is controlled in accordance with the quality of the image that is displayable in the terminal with which the video conference is conducted, and therefore, the terminal apparatus 20 can achieve an advantageous effect of being able to cope with a case where the number of terminal apparatuses 20 participating in the conference increases or decreases and there is a change in the quality of the image that is displayable in the terminal with which the video conference is conducted.

Modification of the Second Embodiment

Figure 9:
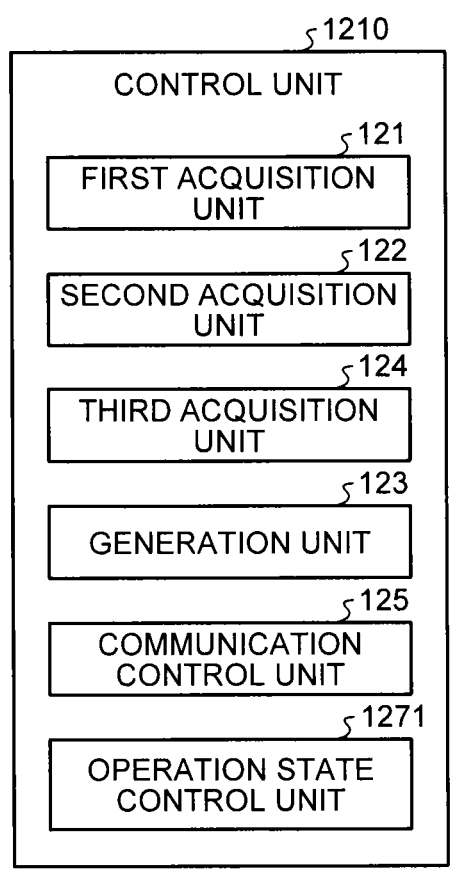
FIG. 9 is a block diagram illustrating an example of functional configuration of a control unit according to a modification of the second embodiment.

FIG. 9 is a block diagram illustrating an example of functional configuration of the control unit 1210 according to a modification of the second embodiment. As illustrated in FIG. 9, the control unit 1210 further includes a third acquisition unit 124. The third acquisition unit 124 obtains a maximum bandwidth indicating the maximum value of the bandwidth of the network available. When the bandwidth indicated by the bandwidth information obtained by the first acquisition unit 121 is equal to or less than the maximum bandwidth, the operation state control unit 1271 determines the fifth information on the basis of the first information associated with the bandwidth information obtained by the first acquisition unit 121 and the fourth information obtained by the second acquisition unit 122. On the other hand, when the bandwidth indicated by the bandwidth information obtained by the first acquisition unit 121 is more than the maximum bandwidth, the operation state control unit 1271 determines the fifth information on the basis of the maximum bandwidth and the fourth information obtained by the second acquisition unit 122.

Figure 10:
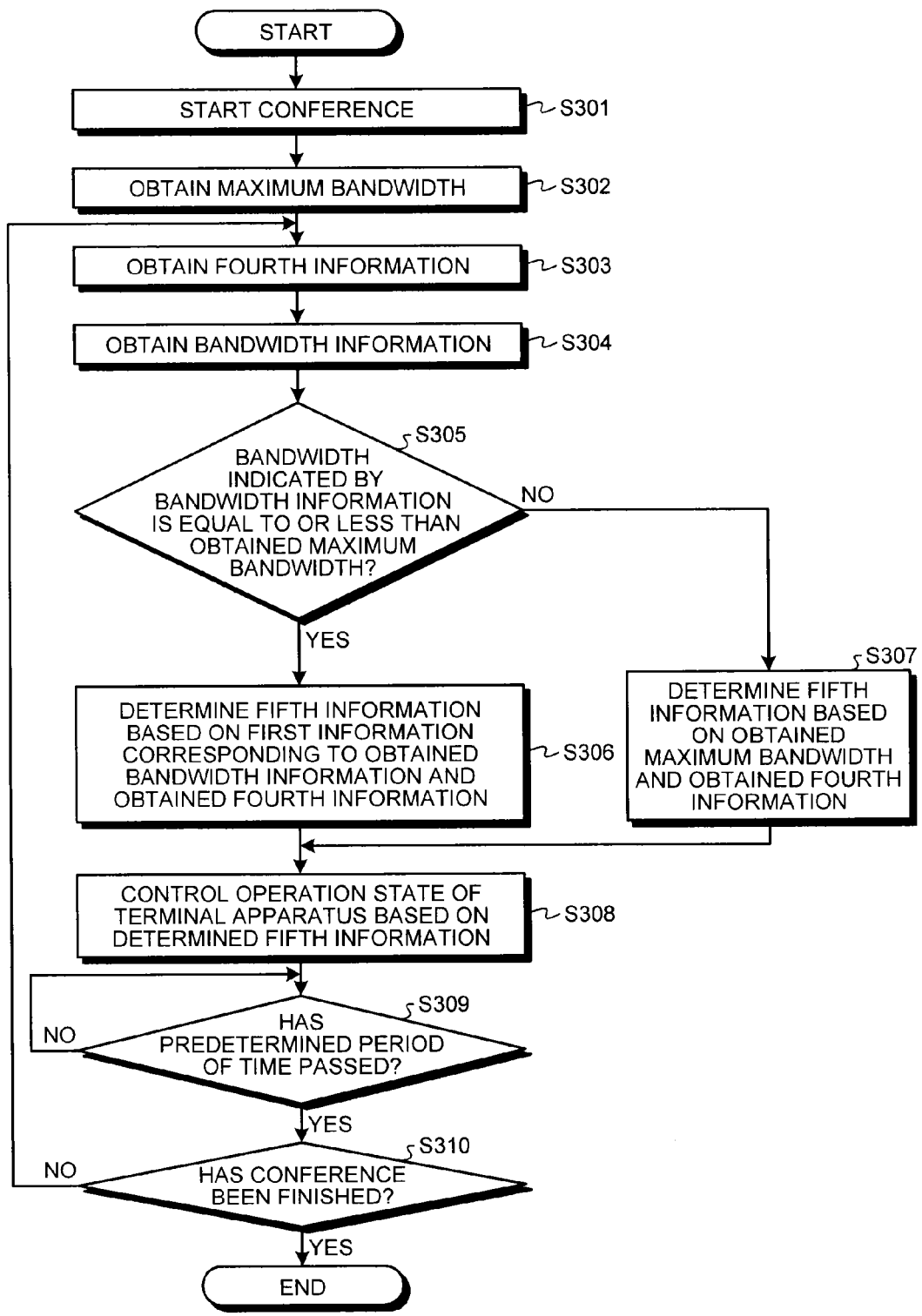
FIG. 10 is a flowchart illustrating an example of processing during video conference executed by the terminal apparatus according to the modification of the second embodiment.

FIG. 10 is a flowchart illustrating an example of processing during the video conference executed by the terminal apparatus 20 according to the modification of the second embodiment.

First, the control unit 1210 carries out, e.g., selection of a terminal with which the video conference is conducted, and thereafter, the control unit 1210 starts the conference on the basis of a command given by the server apparatus 10 (step S301).

Subsequently, the third acquisition unit 124 obtains the maximum bandwidth indicating the maximum value of the bandwidth of the network available for the video conference (step S302).

Subsequently, the second acquisition unit 122 obtains the fourth information indicating the quality of an image that is displayable in a terminal with which the video conference is conducted (step S303).

Subsequently, the first acquisition unit 121 obtains the bandwidth information indicating the bandwidth of the network to which the terminal apparatus 20 is connected (step S304).

Subsequently, the operation state control unit 1271 determines whether the bandwidth indicated by the bandwidth information obtained in step S304 is equal to or less than the maximum bandwidth obtained in step S302 (step S305). When the bandwidth indicated by the bandwidth information obtained in step S304 is equal to or less than the maximum bandwidth obtained in step S302 (step S305: YES), the operation state control unit 1271 determines the fifth information on the basis of the first information corresponding to the bandwidth information obtained in step S304 and the fourth information obtained in step S303 (step S306). The contents of step S306 are the same as the contents of step S204 as illustrated in FIG. 8, and therefore detailed description thereabout is omitted.

On the other hand, when the bandwidth indicated by the bandwidth information obtained in step S304 is more than the maximum bandwidth obtained in step S302 (step S305: NO), the operation state control unit 1271 determines the fifth information on the basis of the maximum bandwidth obtained in step S302 and the fourth information obtained in step S303 (step S307). Now, suppose a case where, for example, the fourth information obtained in step S303 indicates resolution of 640 pixels in the horizontal direction and 360 pixels in the vertical direction and a frame rate of 30 fps, and the band width information obtained in step S302 indicates 2 Mbps or more. In this case, in step S307, the operation state control unit 1271 identifies the first information associated with the bandwidth information indicating 2 Mbps or more from among multiple pieces of first information as illustrated in FIG. 3 (information indicating resolution of 1280 pixels in the horizontal direction and 720 pixels in the vertical direction and information indicating a frame rate of 30 fps in this example). In this case, the quality of an image indicated by the first information thus identified is higher than the quality of an image that can be displayed by a terminal with which the video conference is conducted (the quality of the image indicated by the fourth information obtained in step S302), and therefore, the operation state control unit 1271 determines the fourth information obtained in step S303 as the fifth information indicating the quality of the image transmitted to the terminal with which the video conference is conducted so that the quality of the image transmitted to the terminal with which the video conference is conducted is adjusted to match the quality that can be displayed by the terminal with which the video conference is conducted.

After step S306 and step S307 explained above, the operation state control unit 1271 controls the operation state of the terminal apparatus 20 on the basis of the determined fifth information (step S308). The contents of step S308 are the same as the contents of step S205 as illustrated in FIG. 8, and therefore detailed description thereabout is omitted.

After step S308 explained above, the control unit 120 determines whether a certain period of time has passes or not (step S309). When the control unit 120 determines that the certain period of time has passed (step S309: YES), the control unit 120 determines whether the video conference has been finished or not (step S310). When the control unit 120 determines that the video conference has been finished (step S310: YES), the processing is terminated. On the other hand, when the control unit 120 determines that the video conference has not been finished (step S310: NO), the processing in step S303 and subsequent steps explained above are repeated.

As explained above, in the present embodiment, by applying a limitation to the network bandwidth that can be used, an advantageous effect of being able to prevent blocking other communications with the bandwidth of the video conference can be achieved.

A hardware configuration of the terminal apparatus 20 according to each embodiment and the modification explained above will be explained. The terminal apparatus 20 according to each embodiment and the modification explained above includes a control device such as a CPU, a storage device such as ROM (Read Only Memory) and RAM, an external storage device such as an HDD and an SSD, a display device such as a display, an input device such as a mouse and a keyboard, a communication device such as an NIC, an image-capturing device such as a digital camera, an audio input device such as a microphone, and an audio output device such as a speaker, and can be achieved with a hardware configuration using an ordinary computer.

A program executed by the terminal apparatus 20 according to each embodiment and the modification explained above are provided in such a manner that the programs are stored, as a file in an installable format or in a executable format, to a storage medium that can be read by a computer, such as a CD-ROM, a CD-R, a memory card, a DVD (Digital Versatile Disk), and a flexible disk (FD).

The program executed by the terminal apparatus 20 according to each embodiment and the modification explained above may be provided in such a manner that the program is stored in a computer connected to a network such as the Internet and is downloaded via the network. The program executed by the terminal apparatus 20 according to each embodiment and the modification explained above may be provided or distributed via the network such as the Internet. The program executed by the terminal apparatus 20 according to each embodiment and the modification explained above may be provided in such a manner that the program is embedded into ROM and the like in advance.

The program executed by the terminal apparatus 20 according to each embodiment and the modification explained above is in a module configuration for achieving each unit explained above on a computer. In actual hardware, each of the units explained above is achieved on the computer by causing a control device to read the program from an external storage device to a storage apparatus and execute the program.

According to the embodiments, both of the low power consumption and the optimum image quality can be achieved in accordance with the band width of an available network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus connected to a network, the information processing apparatus comprising:
 a first acquisition unit configured to obtain a piece of bandwidth information that indicates a bandwidth of the network to which the information processing apparatus is connected;
 an operation state control unit configured to control an operation state of the information processing apparatus on the basis of a piece of first information associated with the piece of bandwidth information obtained by the first acquisition unit, the piece of first information being one of a plurality of pieces of first information each indicating a quality of an image that is able to be transmitted via the network by the information processing apparatus, the pieces of first information being stored in association with a plurality of pieces of bandwidth information in a first storage unit;

an image-capturing unit configured to capture an object to generate a captured image;

a generation unit configured to generate the image able to be transmitted by compressing and encoding the captured image; and a transmission unit configured to transmit the image generated by the generation unit via the network, wherein the operation state control unit is configured to determine setting of compression and encoding of the generation unit and resolution of the captured image so as to minimize electric power consumption of the information processing apparatus, on the basis of the piece of first information associated with the piece of bandwidth information obtained by the first acquisition unit, and the operation state control unit is configured to
identify the piece of first information associated with the piece of bandwidth information obtained by the first acquisition unit from among the pieces of first information stored in the first storage unit, identify a piece of second information associated with the identified piece of first information from a second storage unit that stores therein a plurality of pieces of second information each indicating a quality of the image generated by the compression and encoding performed by the generation unit and a plurality of pieces of third information each indicating a quality of the captured image, and first electric powers each indicating an electric power required for the compression and encoding performed by the generation unit so that the pieces of second information, the pieces of third information, and the first electric powers are associated with each other, identify a piece of third information that is associated with the identified piece of second information and that minimizes the associated first electric power from among the pieces of third information stored in the second storage unit, determine a setting of compression and encoding performed by the generation unit, on the basis of a combination of the identified piece of second information and the identified piece of third information, and determine a resolution of the captured image on the basis of the identified piece of third information.

2. An information processing apparatus connected to a network, the information processing apparatus comprising:

a first acquisition unit configured to obtain a piece of bandwidth information that indicates a bandwidth of the network to which the information processing apparatus is connected; and an operation state control unit configured to control an operation state of the information processing apparatus on the basis of a piece of first information associated with the piece of bandwidth information obtained by the first acquisition unit, the piece of first information being one of a plurality of pieces of first information each indicating a quality of an image that is able to be transmitted via the network by the information processing apparatus, the pieces of first information being stored in association with a plurality of pieces of bandwidth information in a first storage unit, wherein the information processing apparatus further comprises a second acquisition unit configured to obtain a piece of second information indicating a quality of an image that is displayable in another terminal via the network, and wherein the operation state control unit is configured to
determine a piece of third information indicating a quality of the image transmitted to the another terminal on the basis of the piece of first information associated with the piece of bandwidth information obtained by the first acquisition unit and the piece of second information obtained by the second acquisition unit, and control the operation state of the information processing apparatus on the basis of the piece of third information.

3. The information processing apparatus according to claim 2 further comprising a third acquisition unit configured to obtain a maximum bandwidth indicating a maximum value of a bandwidth available in the network, wherein the operation state control unit is configured to determine the piece of third information on the basis of the piece of first information associated with the piece of bandwidth information obtained by the first acquisition unit and the piece of second information obtained by the second acquisition unit when the bandwidth indicated by the piece of bandwidth information obtained by the first acquisition unit is equal to or less than the maximum bandwidth, and the operation state control unit is configured to determine the piece of third information on the basis of the maximum bandwidth and the piece of second information obtained by the second acquisition unit when the bandwidth indicated by the piece of bandwidth information obtained by the first acquisition unit is more than the maximum bandwidth.

4. A non-transitory computer-readable storage medium with an executable program stored thereon and executed by a computer, wherein the program instructs the computer to perform:

obtaining a piece of bandwidth information that indicates a bandwidth of a network to which an information processing apparatus is connected; and controlling an operation state of the information processing apparatus on the basis of a piece of first information associated with the obtained piece of bandwidth information, the piece of first information being one of a plurality of pieces of first information each indicating a quality of an image that is able to be transmitted via the network by the information processing apparatus, the pieces of first information being stored in association with a plurality of pieces of bandwidth information in a storage unit, wherein each piece of first information includes at least one of information indicating screen resolution and information indicating a frame rate.

5. An information processing method, comprising:

obtaining a piece of bandwidth information that indicates a bandwidth of a network to which an information processing apparatus is connected;

controlling an operation state of the information processing apparatus on the basis of a piece of first information associated with the obtained piece of bandwidth information, the piece of first information being one of a plurality of pieces of first information each indicating a quality of an image that is able to be transmitted via the network by the information processing apparatus, the pieces of first information being stored in association with a plurality of pieces of bandwidth information in a storage unit;

capturing an object to generate a captured image;
generating the image able to be transmitted by compressing and encoding the captured image; and
transmitting the generated image via the network,
wherein the controlling step further comprises determining setting of compression and encoding in the generating step and resolution of the captured image so as to minimize electric power consumption of the information processing apparatus, on the basis of the piece of first information associated with the obtained piece of bandwidth information, and the controlling step further comprises
identifying the piece of first information associated with the obtained piece of bandwidth information from among the pieces of first information stored in the storage unit,
identifying a piece of second information associated with the identified piece of first information from a second storage unit that stores therein a plurality of pieces of second information each indicating a quality of the image generated by the compression and encoding and a plurality of pieces of third information each indicating a quality of the captured image, and first electric powers each indicating an electric power required for the compression and encoding so that the pieces of second information, the pieces of third information, and the first electric powers are associated with each other,
identifying a piece of third information that is associated with the identified piece of second information and that minimizes the associated first electric power from among the pieces of third information stored in the second storage unit,
determining a setting of compression and encoding on the basis of a combination of the identified piece of second information and the identified piece of third information, and
determining a resolution of the captured image on the basis of the identified piece of third information.

6. An information processing method, comprising:
obtaining a piece of bandwidth information that indicates a bandwidth of a network to which an information processing apparatus is connected;
controlling an operation state of the information processing apparatus on the basis of a piece of first information associated with the obtained piece of bandwidth information, the piece of first information being one of a plurality of pieces of first information each indicating a quality of an image that is able to be transmitted via the network by the information processing apparatus, the pieces of first information being stored in association with a plurality of pieces of bandwidth information in a storage unit,
obtaining a piece of second information indicating a quality of an image that is displayable in another terminal via the network,
wherein the controlling step further comprises
determining a piece of third information indicating a quality of the image transmitted to the another terminal on the basis of the piece of first information associated with the obtained piece of bandwidth information and the obtained piece of second information, and
controlling the operation state of the information processing apparatus on the basis of the piece of third information.

7. A non-transitory computer-readable storage medium with an executable program stored thereon and executed by a computer, wherein the program instructs the computer to perform:
obtaining a piece of bandwidth information that indicates a bandwidth of a network to which an information processing apparatus is connected;
controlling an operation state of the information processing apparatus on the basis of a piece of first information associated with the obtained piece of bandwidth information, the piece of first information being one of a plurality of pieces of first information each indicating a quality of an image that is able to be transmitted via the network by the information processing apparatus, the pieces of first information being stored in association with a plurality of pieces of bandwidth information in a storage unit;
capturing an object to generate a captured image;
generating the image able to be transmitted by compressing and encoding the captured image; and
transmitting the generated image via the network,
wherein the controlling step further comprises determining setting of compression and encoding and resolution of the captured image so as to minimize electric power consumption of the information processing apparatus, on the basis of the piece of first information associated with the obtained piece of bandwidth information, and
the controlling step further comprises
identifying the piece of first information associated with the obtained piece of bandwidth information from among the obtained pieces of first information stored in the storage unit,
identifying a piece of second information associated with the identified piece of first information from a second storage unit that stores therein a plurality of pieces of second information each indicating a quality of the image generated by the compression and encoding and a plurality of pieces of third information each indicating a quality of the captured image, and first electric powers each indicating an electric power required for the compression and encoding so that the pieces of second information, the pieces of third information, and the first electric powers are associated with each other,
identifying a piece of third information that is associated with the identified piece of second information and that minimizes the associated first electric power from among the pieces of third information stored in the second storage unit,
determining a setting of compression and encoding, on the basis of a combination of the identified piece of second information and the identified piece of third information, and
determining a resolution of the captured image on the basis of the identified piece of third information.

8. A non-transitory computer-readable storage medium with an executable program stored thereon and executed by a computer, wherein the program instructs the computer to perform:
obtaining a piece of bandwidth information that indicates a bandwidth of a network to which an information processing apparatus is connected;
controlling an operation state of the information processing apparatus on the basis of a piece of first information associated with the obtained piece of bandwidth information, the piece of first information being one of a plurality of pieces of first information each indicating a quality of an image that is able to be transmitted via the network by the information processing apparatus, the pieces of first information being stored in association with a plurality of pieces of bandwidth information in a storage unit, obtaining a piece of second information indicating a quality of an image that is displayable in another terminal via the network, wherein the controlling step further comprises
- determining a piece of third information indicating a quality of the image transmitted to the another terminal on the basis of the piece of first information associated with the obtained piece of bandwidth information and the obtained piece of second information, and
- controlling the operation state of the information processing apparatus on the basis of the piece of third information.

* * * * *